United States Patent [19]

Cheetham et al.

[11] Patent Number: 4,509,559
[45] Date of Patent: Apr. 9, 1985

[54] FIRE-BARRIERS

[75] Inventors: Ivan C. Cheetham; George A. Pope, both of Sutton Coldfield, England

[73] Assignee: Dunlop Limited, London, England

[21] Appl. No.: 477,663

[22] Filed: Mar. 22, 1983

[30] Foreign Application Priority Data

Mar. 30, 1982 [GB] United Kingdom ............ 8209258

[51] Int. Cl.³ .............................................. F16L 11/00
[52] U.S. Cl. .................................... 138/121; 138/122; 138/124; 138/127; 138/134; 138/137
[58] Field of Search ............... 138/121, 122, 134, 137, 138/149; 428/36, 920, 921; 138/124, 127; 174/121 A

[56] References Cited

U.S. PATENT DOCUMENTS

| | | | |
|---|---|---|---|
| 3,346,016 | 10/1967 | Blau et al. | 138/138 |
| 3,540,488 | 11/1970 | Voorhees | 138/121 |
| 4,175,631 | 11/1979 | Ishii et al. | 428/920 X |
| 4,190,088 | 2/1980 | Lalikos et al. | 428/921 X |
| 4,265,953 | 5/1981 | Close | 428/920 X |
| 4,275,769 | 6/1981 | Cooke | 138/137 X |
| 4,307,756 | 12/1981 | Voigt et al. | 138/149 |
| 4,310,585 | 1/1982 | Shannon | 138/149 X |
| 4,319,940 | 3/1982 | Arroyo et al. | 428/921 X |
| 4,324,835 | 4/1982 | Keen | 428/921 X |
| 4,363,739 | 12/1982 | Okamura et al. | 428/921 X |
| 4,387,311 | 6/1983 | Kobayashi et al. | 428/921 X |

FOREIGN PATENT DOCUMENTS

| | | |
|---|---|---|
| 2124321 | 9/1972 | France . |
| 740732 | 11/1955 | United Kingdom . |
| 1327533 | 8/1973 | United Kingdom . |
| 1575308 | 9/1980 | United Kingdom . |

Primary Examiner—Stephen Marcus
Assistant Examiner—Mark Thronson
Attorney, Agent, or Firm—Stevens, Davis, Miller & Mosher

[57] ABSTRACT

A fire-barrier comprises a composite of three types of fire-retardant materials operable sequentially to combat an increase in temperature, e.g. as occurs on outbreak of a fire, by different methods. A preferred combination of materials is an outer layer of heat reflective material, an inner layer of thermally intumescent material and an intermediate layer of endothermal material between the inner and outer layers.

14 Claims, 1 Drawing Figure

U.S. Patent  Apr. 9, 1985  4,509,559
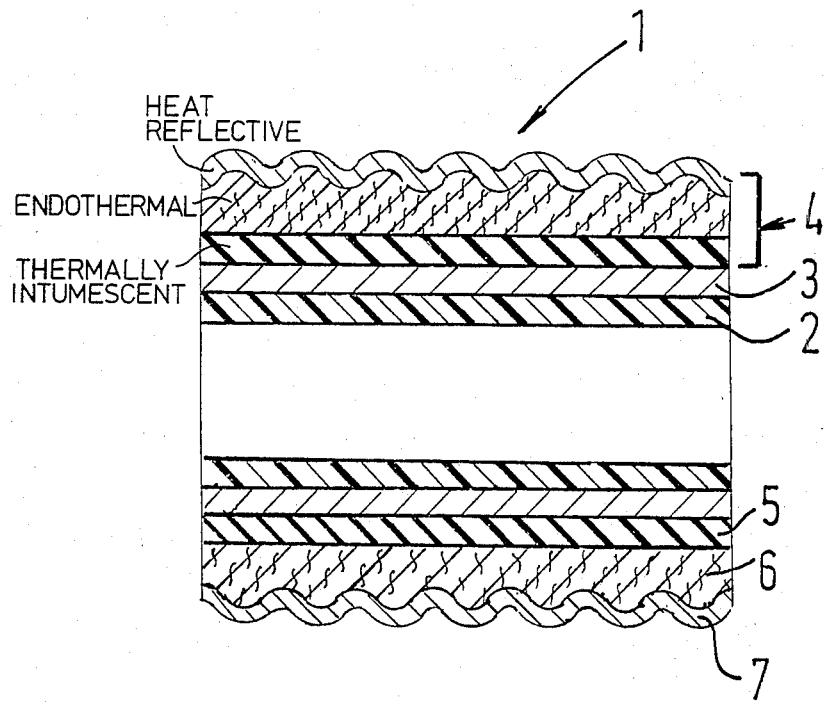

FIRE-BARRIERS

This invention relates to fire-barriers and in particular, though not exclusively, to flexible fire-barriers.

According to the present invention a fire-barrier comprises a composite of at least three fire-retardant materials comprising a heat-reflective material, an endothermal material and a thermally intumescent material.

The heat reflective material is arranged to form the outer surface of the fire-barrier, suitable materials being metals or metal alloys, e.g. polished aluminium or stainless steel, capable of withstanding the temperatures to which the fire-barrier may be subjected in use. The heat reflective material may vary in thickness from relatively thin metal film or foil to substantially thicker metal sheet depending on the required strength characteristics of the fire-barrier for any given application. Flexibility of a given thickness of heat reflective material may be increased by appropriate selection of the configuration of the heat reflective material, for example the material may be of convolute profile e.g. separate corrugations or a close helix.

The endothermal material, e.g. aluminium hydrate, absorbs heat by a change in state of the material and is preferably arranged between the heat reflective material and the thermally intumescent material on a suitable carrier, e.g. a fibrous fire-resistant material impregnated with the endothermal material. Preferably the carrier material has good heat insulation characteristics and contributes to the heat absorption capability of the intermediate layer. Suitable carrier materials include carbon fibres, asbestos fibres, ceramic fibres and glass fibres. The endothermal material may be attached to the carrier by a binder.

The thermally intumescent material may consist of:
1. A carbonific compound to ensure the presence of a char which may be either a polyhydric compound of high carbon content (e.g. starch, sugars, pentaerythritol) or an aromatic compound which can polymerize to a ladder structure (e.g. ortho and paranitroanilines).
2. A spumific compound which causes the carbonific compound to char and foam, usually an inorganic acid (e.g. boric, phosphoric or sulphuric acids) or a compound which on decomposition will yield an inorganic acid (e.g. mono-di ammonium phosphates, phosphates, melamine, urea, para-nitroaniline bisulphate).
3. A blowing agent. This may be provided by the decomposition of the spumific compound or alternatively a compound may be added which evolves non-flammble gas such as ammonia, carbon dioxide or hydrogen chloride (e.g. urea, melamine and chlorinated paraffins).
4. A char forming aid (e.g. phenol/formaldehyde resin, urea/formaldehyde) may also be added to the system.

The intumescent material may be compounded with an elastomer e.g. chlorinated rubber or polyacrylate.

Fire-barriers according to the present invention have a number of applications for example as protective coverings for hoses used to transport inflammable fluids, e.g. fuel, oil, various chemicals, or cables where the fire-barrier may be applied separately e.g. by wrapping around the hose or cable or formed as an integral part of the hose or cable, as constituents of safety-curtains, protective clothing etc.

The invention will now be described in more detail, by way of example only, with reference to the accompanying drawing in which the single FIGURE is a longitudinal section through a hose incorporating a fire-barrier according to the present invention.

The hose 1 shown in the accompanying drawing is for transporting oil which is at a high pressure and comprises an inner liner 2 of oil resistant elastomeric material e.g. a nitrile rubber compound, a reinforcement structure 3, e.g. braided steel cord embedded in a polymer matrix, bonded to the liner 2 and a fire-barrier 4 capable of withstanding high temperatures, for example 700° C. in open flames for 30 minutes.

The fire-barrier 4 comprises three layers 5,6 and 7 of fire-retardant materials. The innermost layer 5 comprises a layer of chlorinated rubber, e.e. neoprene, chlorinated polyethylene, containing thermally intumescent chemicals, e.g. starch and ammonium polyphosphate including blowing agents, e.g. urea, melamine, bonded to the reinforcement structure 3. The outermost layer 7 comprises a polished metal sleeve of convolute profile formed by a plurality of separate corrugations to provide a degree of flexibility in the finished hose. The centre layer 6 comprises a layer of ceramic fibre blanket impregnated with a paste of aluminium hydrate.

In use in the event of a fire breaking out in the vicinity of the hose the polished metal sleeve constituting the outer surface of the hose reflects the heat of the fire until the surface becomes oxidized or blackened by smoke following which the heat of the fire is conducted by the metal sleeve to the centre layer 6 resulting in increase in temperature and consequent breakdown of the aluminium hydrate with absorption of heat to yield a large volume of water which exerts a cooling effect on the hose. Further absorption of heat occurs as the water is subsequently heated and eventually converted to steam. The carrier, in this example ceramic fibre, has good heat insulation characteristics and contributes to the absorption of heat by the intermediate layer. Finally with further increase in temperature within the hose the layer 5 of chlorinated rubber containing intumescent materials swells and carbonizes to form a final protective insulating honeycomb around the interior of the hose.

It will be appreciated from the foregoing description of the operation of the fire-barrier according to the present invention that the combination of three types of fire-retardant material operable sequentially to combat increase in temperature of the surroundings such as occurs on outbreak of a fire by different methods, viz reflection, absorption, insulation, provides a particularly effective fire-barrier capable of withstanding higher temperatures than any one of the materials when used alone as a fire-barrier.

A further advantage of the fire-barrier according to the present invention is that it is impermeable to fluids (liquid or gases) being transported due to the provision of the outer metal sleeve. As a result leakage of the transported material is prevented even if the temperature increase is sufficient to penetrate the fire-barrier and cause failure of the reinforcement structure 3 and inner liner 2.

Having now described our invention what we claim is:

1. A flexible fluid impermeable hose for conveying fluid, said hose having an inner liner of elastomeric material, a reinforcement structure surrounding said liner and an outer cover surrounding said reinforcement structure, said outer cover comprising a flexible fire-barrier consisting of a fluid impermeable outer layer of heat reflective, material, an inner layer of thermally intumescent material compounded with elastomer, and an intermediate layer of endothermal material between said inner and outer layers.

2. A hose according to claim 1 wherein said reinforcement structure is bonded to said liner and to said cover.

3. A hose according to claim 1 wherein said endothermal material is supported on a fibrous fire resistant carrier.

4. A flexible hose for conveying fluid, said hose having an outer cover comprising a flexible fire-barrier consisting of an outer layer of heat reflective material, an inner layer of thermally intumescent material compounded with elastomer, and an intermediate layer of endothermal material between said inner and outer layers.

5. A hose according to claim 4 wherein said heat-reflective material is of convolute profile.

6. A hose according to claim 4 wherein said endothermal material is supported on a carrier.

7. A hose according to claim 6 wherein said carrier is selected from the group consisting of carbon fibres, asbestos fibres, ceramic fibres and glass fibres, impregnated with said endothermal material.

8. A hose according to claim 4 wherein said intumescent material includes a carbonific compound.

9. A hose according to claim 8 wherein said intumescent material further includes one or more of a spumific compound, a blowing agent and a char forming aid.

10. A hose according to claim 4 wherein said heat reflective material is fluid impermeable.

11. A hose according to claim 4 wherein said fire-barrier is applied separately as an external wrapping around the article.

12. A hose according to claim 4 wherein said fire-barrier is formed as an integral part of the hose.

13. A flexible hose according to claim 5 wherein said convolute profile comprises separate corrugations.

14. A flexible hose according to claim 5 wherein said covolute profile comprises a helix.

* * * * *